US 8,817,918 B2

(12) United States Patent
Dubey et al.

(10) Patent No.: US 8,817,918 B2
(45) Date of Patent: Aug. 26, 2014

(54) CYCLIC PREFIX AND PRECURSOR JOINT ESTIMATION

(75) Inventors: Amit Ranjan Dubey, Los Angeles, CA (US); Cimarron Mittelsteadt, Santa Clarita, CA (US)

(73) Assignee: ViXS Systems, Inc., Toronto, Ontario (CA)

( * ) Notice: Subject to any disclaimer, the term of this patent is extended or adjusted under 35 U.S.C. 154(b) by 0 days.

(21) Appl. No.: 13/324,225

(22) Filed: Dec. 13, 2011

(65) Prior Publication Data

US 2013/0148767 A1    Jun. 13, 2013

(51) Int. Cl.
 *H04B 1/10* (2006.01)

(52) U.S. Cl.
USPC .......................................... 375/340; 375/315

(58) Field of Classification Search
USPC .................................. 375/340, 316
See application file for complete search history.

(56) References Cited

U.S. PATENT DOCUMENTS

| | | | | |
|---|---|---|---|---|
| 7,489,719 | B1 * | 2/2009 | Giardina ........................ | 375/130 |
| 2002/0106035 | A1 * | 8/2002 | Harikumar et al. ............ | 375/316 |
| 2004/0208266 | A1 * | 10/2004 | Lenosky ........................ | 375/346 |
| 2006/0013325 | A1 * | 1/2006 | Agrawal et al. ............... | 375/260 |

OTHER PUBLICATIONS

Bingham, John A. C., "ADSL, VDSL, and Multicarrier Modulation," John Wiley & Sons, Inc., 2000, §6.2, pp. 95-99.
Celebi, Samel, "Interblock Interference (IBI) and Time of Reference (TOR) Computation in OFDM Systems," IEEE Transactions on Communications, vol. 49, No. 11, Nov. 2001, pp. 1895-1900.
CTE Implication Paper, "The Challenges and Rewards of MoCA Deployment for the Home Network," An Implication paper prepared for the Society of Cable Telecommunications Engineers by Spirent Communications, http://mocalliance.org/marketing/white_papers/Spirent_white_paper.pdf, pp. 1-29, downloaded Aug. 30, 2011.
Chow, Peter S., et al., "DMT-Based ADSL: Concept, Architecture, and Performance," The Institute of Electrical Engineers, 1994, 6 pages, IEE, London, UK.
Ovadia, Shlomo, "Home Networking on Coax for Video and Multimedia," Overview for IEEE 802.1AVB, Multimedia over Coax Alliance, May 30, 2007, pp. 1-15.

* cited by examiner

*Primary Examiner* — Michael Neff
(74) *Attorney, Agent, or Firm* — Abel Law Group, LLP (57) ABSTRACT

A method of operating a communications system includes generating a channel impulse response estimate based on a first received signal. The method includes selecting a precursor and a cyclic prefix length for a second received signal based on the channel impulse response estimate, a target cyclic prefix energy level, and a predetermined range of cyclic prefix lengths.

21 Claims, 9 Drawing Sheets

CYCLIC PREFIX AND PRECURSOR JOINT ESTIMATION

BACKGROUND

1. Field of the Invention

The present invention relates to communications systems, and more particularly, to cyclic prefix selection in communications systems.

2. Description of the Related Art

In a typical telecommunications system, a cyclic prefix serves as a guard interval that reduces or eliminates intersymbol interference from a previous symbol. In addition, the cyclic prefix facilitates modeling linear convolution of a frequency-selective multipath channel as circular convolution, which in turn may be transformed to the frequency domain using a discrete Fourier transform. This approach allows for simple frequency domain processing, such as for channel estimation, equalization, and demapping and recovery of transmitted data. In the typical communications system, the cyclic prefix typically has a predetermined, fixed length, which is chosen to be at least equal to the length of the multipath channel.

SUMMARY OF EMBODIMENTS OF THE INVENTION

In at least one embodiment of the invention, a method of operating a communications system includes generating a channel impulse response estimate based on a first received signal. The method includes selecting a precursor and a cyclic prefix length for a second received signal based on the channel impulse response estimate, a target cyclic prefix energy level, and a predetermined range of cyclic prefix lengths.

In at least one embodiment of the invention, an apparatus includes a channel estimator configured to generate a channel impulse response estimate in response to a first received signal. The apparatus includes a cyclic prefix and precursor joint selection module configured to determine a cyclic prefix length and a precursor based on the channel impulse response estimate, a target cyclic prefix energy level, and a predetermined range of cyclic prefix lengths.

In at least one embodiment of the invention, a computing node includes a processor configured to process data recovered from a received signal. The computing node includes a receiver front-end configured to generate a baseband modulated signal based on a received signal. The computing node includes a receiver path configured to recover the data from the baseband modulated signal according to a cyclic prefix length and precursor based on a channel impulse response estimate, a target cyclic prefix energy level, and a predetermined range of cyclic prefix lengths.

BRIEF DESCRIPTION OF THE DRAWINGS

The present invention may be better understood, and its numerous objects, features, and advantages made apparent to those skilled in the art by referencing the accompanying drawings.

The use of the same reference symbols in different drawings indicates similar or identical items.

DETAILED DESCRIPTION

In an exemplary communications system, a fixed cyclic prefix having a length $N_{CP}$, is prepended to a symbol of N samples. The cyclic prefix serves as a guard interval that reduces or eliminates intersymbol interference and facilitates modeling linear convolution of a frequency-selective multipath channel as circular convolution, which in turn may be transformed to the frequency domain using a discrete Fourier transform. Since the cyclic prefix includes redundant data, the transmission of the cyclic prefix consumes bandwidth, which reduces a realizable data rate for the communications system. Thus, the choice of length for the cyclic prefix is a compromise between efficiency and performance (e.g., bit error rate) of the communications system. In the exemplary communications system, the length of the cyclic prefix is determined prior to system implementation based on a predicted channel length and a target data rate. Once the system is deployed, the length of the cyclic prefix is fixed. However, an approximation for a length of the actual channel that provides target performance may be shorter than the predicted fixed channel length, making a fixed cyclic prefix length longer than necessary, which unnecessarily reduces the data rate. A technique to increase throughput over particular channels includes implementing a variable cyclic prefix length. A cyclic prefix length is selected according to actual channel conditions, which allows reduction of the cyclic prefix length from a maximum length. For example, the cyclic prefix length may be reduced from the maximum cyclic prefix length for nodes configured to communicate over channels with channel lengths shorter than channel lengths corresponding to a maximum allowable cyclic prefix length.

Figure 1:
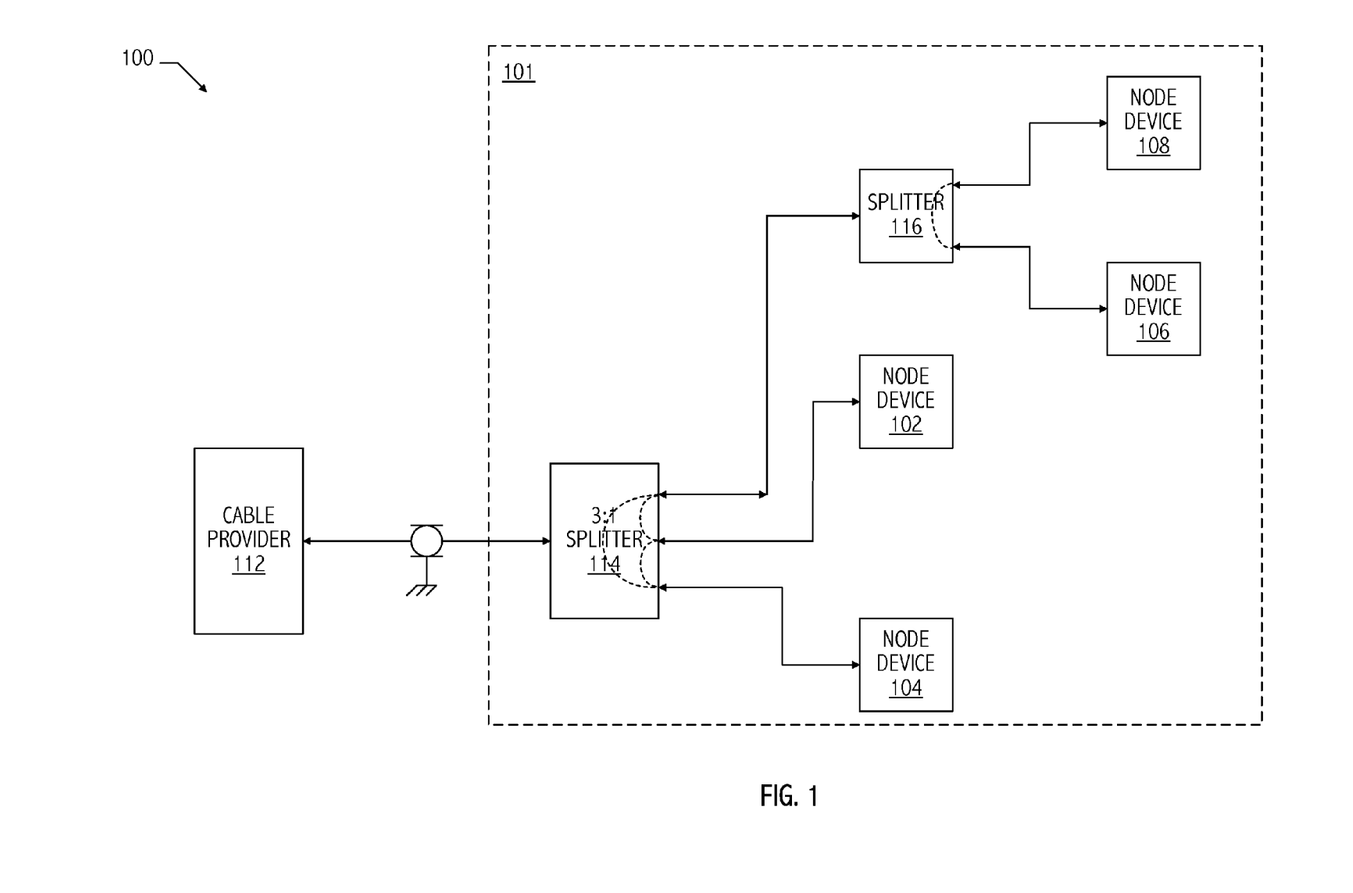
FIG. 1 illustrates a functional block diagram of an exemplary communications network.

Referring to FIG. 1, in an exemplary digital communications network (e.g., network 100) nodes (e.g., nodes 102, 104, 106, and 108) and splitters (e.g., splitters 114 and 116) are configured as a local area network (e.g., network 101) using communications over a channel (e.g., coaxial cables). In at least one embodiment of network 100, nodes 102, 104, 106, and 108 communicate with a wide-area network (e.g., cable provider 112) via splitter 114 and/or splitter 116. In addition, in at least one embodiment of network 100, nodes 102, 104, 106, and 108 communicate with each other via splitter jumping.

Figure 2:
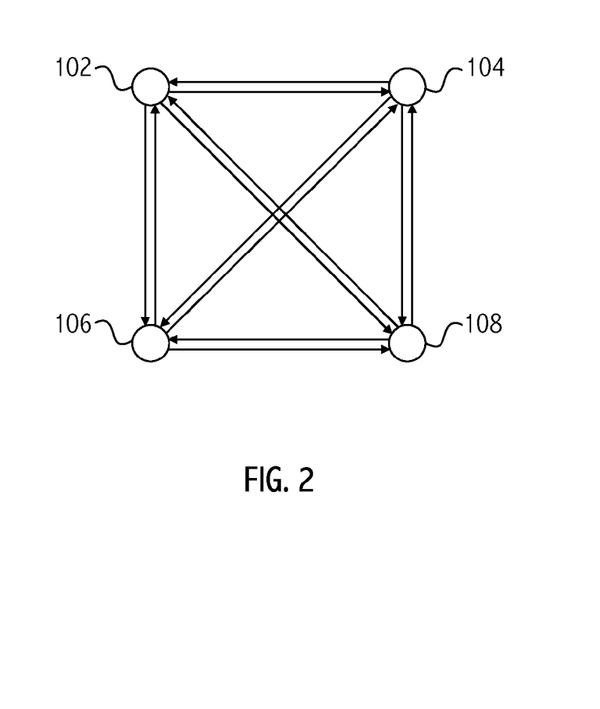
FIG. 2 illustrates an exemplary logical topology of node devices of the communications network of FIG. 1.

Note that due to effects of splitter jumping and reflections at different terminations of network 101, channel characteristics (e.g., attenuation and delay) for a link between two nodes may be different from the channel characteristics for a link between two other nodes. In addition, channel characteristics in a forward path may be different from channel characteristics in a reverse path. Thus, channel capacity between each source node and destination node varies from the channel capacity for two other source nodes and destination nodes. Accordingly, to appropriately use the channel capacity of network 101, individual nodes of network 101 determine and store suitable separate physical (PHY) parameters tailored for each link (i.e., store separate PHY profiles for each link). Referring to FIG. 2, a logical model of network 101 is a fully-meshed collection of point-to-point links Each link has unique channel characteristics and capacity. In addition to point-to-point communications, network 101 supports broadcast and multicast communications in which a source node uses a common set of PHY parameters that may be received by all destination nodes.

In at least one embodiment of network 101, nodes 102, 104, 106, and 108 share a physical channel. Thus, only one node is allowed to transmit at a particular time. For example, the physical channel is time division-multiplexed and coordinated by a Media Access Control (MAC) data communication protocol sublayer using time division multiple access (TDMA). In at least one embodiment, network 101 is a centrally coordinated system with one node being a network-coordinator (NC). A node that is the NC transacts data on the network like any other node, but is also responsible for transmitting beacons to advertise network presence and timing, coordinating a process for admitting nodes to the network, scheduling and coordinating transmission of data among all nodes in the network, scheduling and coordinating link-maintenance operations (e.g., operations during which nodes update their physical profiles), and other functions.

In at least one embodiment of node 102, a cyclic prefix is concatenated with modulated symbols to form an Adaptive Constellation Multi-tone (ACMT) symbol. For example, one ACMT symbol is formed by copying and prepending a number of last samples (i.e., cyclic prefix samples ($N_{CP}$)) of an inverse first Fourier transform (IFFT) output (N samples), resulting in an output symbol having $N+N_{CP}$ samples. Multiple ACMT symbols are concatenated to form a packet. In general, a receiver is configured to discard the cyclic prefix samples. However, the cyclic prefix serves two purposes. First it serves as a guard interval that reduces or eliminates intersymbol interference from a previous symbol. Secondly, the cyclic prefix facilitates modeling linear convolution of a frequency-selective multipath channel as circular convolution, which in turn may be transformed to the frequency domain using a discrete Fourier transform. This approach allows for simple frequency-domain processing, such as for channel estimation, equalization, and demapping and recovery of the transmitted data bits. The length of the cyclic prefix is chosen to be at least equal to the length of the multipath channel.

Figure 3:
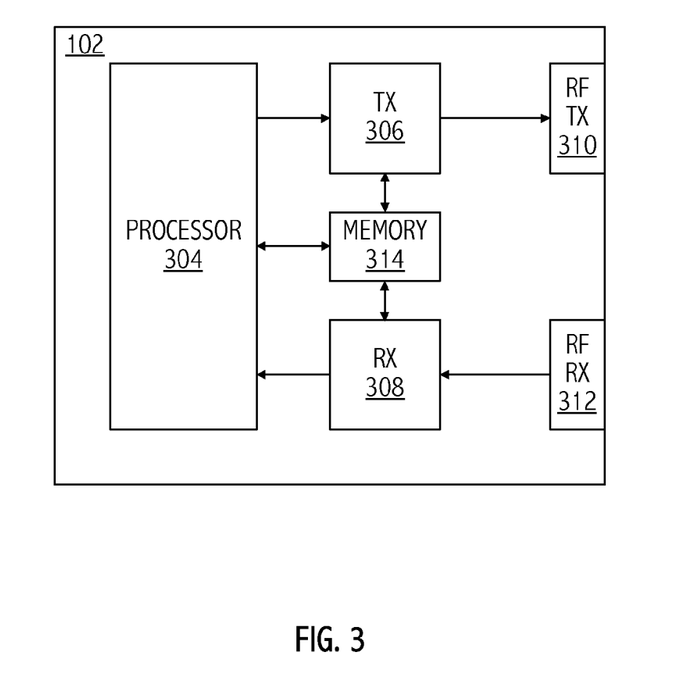
FIG. 3 illustrates a functional block diagram of an exemplary node device of the communications network of FIG. 1.

Referring to FIG. 3, an exemplary node 102 includes a processor configured to generate and process data communicated over network 101. Data to be transmitted over the network is digitally processed in transmitter 306 and transmitted over the channel using RF transmitter 310. In at least one embodiment, node 102 includes a radio frequency receiver configured to receive analog signals over the channel and to provide a baseband analog signal to the receiver path (e.g., receiver 308), which digitally processes the baseband signal to recover data and control information symbols and provide it to processor 304.

In at least one embodiment, node 102 implements orthogonal frequency division multiplexing (OFDM). In general, OFDM is a frequency-division multiplexing scheme utilized as a digital multi-carrier modulation method in which a large number of orthogonal subcarriers having closely-spaced frequencies are used to carry data. The data is divided into several parallel data streams or channels (i.e., frequency bins or bins), one for each sub-carrier. Each subcarrier is modulated with a conventional modulation scheme (e.g., quadrature amplitude modulation or phase shift keying) at a low symbol rate, maintaining total data rates similar to conventional single-carrier modulation schemes in the same bandwidth. In at least one embodiment of node 102, the physical interface (e.g., transmitter 306 and receiver 308) utilizes Adaptive Constellation Multi-tone (ACMT), i.e., node 102 pre-equalizes modulation to the frequency response of each link using bit loaded OFDM. In addition, channel profiling techniques tailor the modulation for each link. In at least one embodiment of node 102, physical layer channels are approximately 50 MHz wide (i.e., the ACMT sampling rate is approximately 50 MHz) and the total number of OFDM subcarriers is 256. However, other sampling rates and numbers of subcarriers may be used. In at least one embodiment of node 102, due to DC and channel edge considerations, only 224 of the 256 subcarriers are available for typical communications.

In at least one embodiment of node 102, a modulation profile is generated based on probe packets sent between nodes and analyzed at the receiving nodes. After analysis, a receiving node assigns numbers of bits to subcarriers for a particular link and communicates this information to node 102. An individual ACMT subcarrier may be active or inactive (i.e., turned off). An active ACMT subcarrier is configured to carry one to eight bit Quadrature Amplitude Modulation (QAM) symbols. In at least one embodiment of node 102, transmit power of a sending node is dynamically adjusted based on modulation profiling using the probe packets and based on link performance.

In general, the channel is time-varying and link maintenance operations (LMOs) facilitate the recalculation of PHY parameters. Thus, at regular intervals a transmitting node sends one or more probe packets which are received and analyzed by receiving nodes. The receiving nodes send back probe reports to the corresponding transmitting nodes. Those probe reports may include updated parameters. In at least one embodiment of node 102, each probe packet includes a preamble and a payload. In at least one embodiment of node 102, multiple probe types are used for characterization of different network elements. In at least one embodiment of node 102, probe and/or payload packets include a preamble that includes one or more symbols used for channel estimation.

Figure 4:
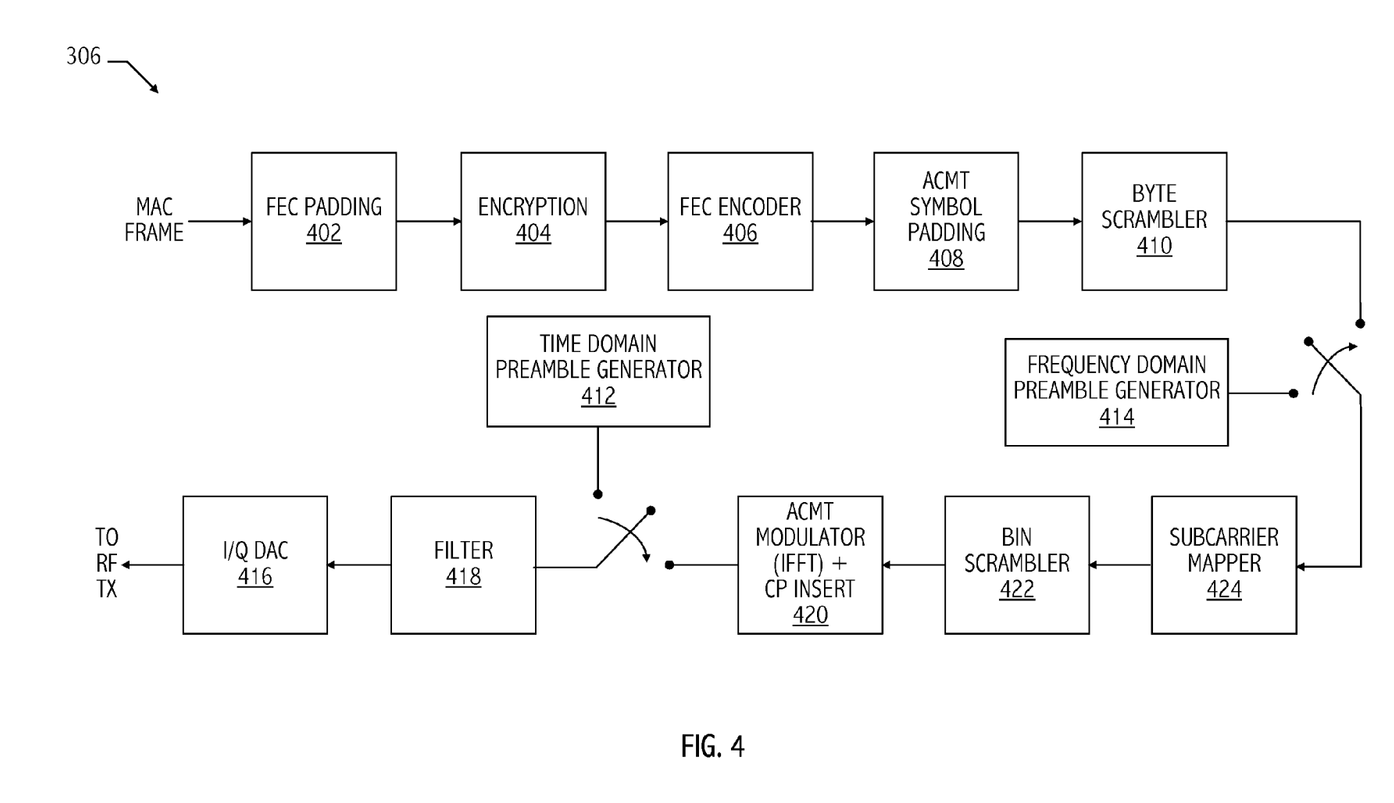
FIG. 4 illustrates a functional block diagram of an exemplary transmitter path of the node device of FIG. 3 consistent with at least one embodiment of the invention.

Referring to FIG. 4, in at least one embodiment, transmitter 306 receives a frame of data from a Medium Access Control data communication protocol sub-layer (i.e., MAC layer). In at least one embodiment of transmitter 306, a channel coding module (e.g., FEC padding module 402) pads bytes so that the FEC encoder receives the required number of bits. In at least one embodiment of transmitter 306, an encryption module (e.g., encryption module 404) encrypts the frame to deter eavesdropping and provide link layer privacy. In at least one embodiment, encryption module 404 implements 56 bit Data Encryption Standard (DES) encryption using a privacy key generated and received from the NC. However, in other embodiments of transmitter 306, other encryption techniques may be used.

In at least one embodiment of transmitter 306, an encoder (e.g., forward error correction (FEC) encoder 406) encodes the frame using up to two different Reed-Solomon block sizes. All codewords except the last are coded with the maximum Reed-Solomon block size, while the last block may be coded using a shorter block size to reduce the FEC padding. FEC encoder 406 encodes the frame with redundancies using a predetermined algorithm to reduce the number of errors that may occur in the message and/or allow correction of any errors without retransmission. Note that in other embodiments of transmitter 306, other types of forward error correction are used (e.g., other block codes or convolutional codes). In at least one embodiment of transmitter 306, a padding module (e.g., ACMT symbol padding module 408) inserts additional bits into the data to form symbols having a particular ACMT symbol size. In at least one embodiment of transmitter 306, a scrambler module (e.g., byte scrambler 410) scrambles each transmitted data byte to change the properties of the transmitted data stream. For example, byte scrambler 410 facilitates data recovery by reducing dependence of the signal power spectrum on the actual transmitted data and/or reducing or eliminating occurrences of long sequences of '0' or '1' that may otherwise cause saturation of digital circuitry and corrupt data recovery. In at least one embodiment of transmitter 306, an ACMT subcarrier mapping module (e.g., subcarrier mapper 424) maps bits of data to ACMT subcarriers according to a predetermined bit loading profile (e.g., a bit loading profile received from a receiving node and stored in memory). In at least one embodiment of transmitter 306, the predetermined profile is selected from a plurality of predetermined profiles according to a particular mode or packet type (e.g., beacon mode, diversity mode, Media Access Plan (MAP), unicast, or broadcast) and link for transmission (e.g., a profile stored for a particular receiving node).

In at least one embodiment of transmitter 306, a scrambler module (e.g., bin scrambler 422) scrambles the data of the ACMT subcarriers to change the properties of the transmitted data stream (e.g., reduce dependence of the signal power spectrum on the actual transmitted data or to reduce or eliminate occurrences of long sequences of '0' or '1') to properties that facilitate data recovery. A modulator (e.g., ACMT modulator 420) generates the time domain in-phase and quadrature (i.e., I and Q) components corresponding to the OFDM signal. ACMT modulator 420 includes an N-point IFFT and inserts a cyclic prefix to the modulated data (i.e., inserts the cyclic prefix to time domain symbols). For example, ACMT modulator 420 copies the last $N_{CP}$ samples of the IFFT output (e.g., N samples) and prepends those samples to the IFFT output to form an OFDM symbol output (e.g., $N+N_{CP}$ samples). The cyclic prefix is used as a guard interval to reduce or eliminate intersymbol interference from a previous symbol and also to facilitate linear convolution of the channel to be modeled as a circular convolution, which may be transformed to the frequency domain using a discrete Fourier transform. This approach allows for simple frequency-domain processing, such as for channel estimation, equalization, and demapping and recovery of transmitted data. The length of the cyclic prefix is chosen to be at least equal to the length of the multipath channel. In at least one embodiment of transmitter 408, filter 418 limits the frequency band of the signal to a signal having a particular spectral mask prior to digital-to-analog conversion (e.g., by digital-to-analog converter 416) and any frequency modulation to a higher frequency band (e.g., from baseband to one of four frequency bands in the range of 850 MHz to 1525 MHz at 25 MHz increments) for transmission.

Depending upon a particular communication type, in at least one embodiment of transmitter 306, frequency domain preamble generator 414 or time domain preamble generator 412 inserts a preamble into the packet prior to processing a MAC frame of data. For example, rather than processing a MAC frame through the portion of the transmitter path including FEC padding module 402, encryption module 404, FEC encoder 406, ACMT symbol padding module 408, and byte scrambler 410, an alternate source (e.g., frequency domain preamble generator 414) provides a plurality of frequency domain preamble symbols, including one or more frequency domain symbols (e.g., which are generated or retrieved from a storage device) to subcarrier mapper 424. Subcarrier mapper 424 maps bits of those frequency domain preamble symbols to individual subcarriers. Those frequency domain preamble symbols are then processed by the remainder of transmitter 306 (e.g., bit scrambled, ACMT modulated, filtered, and converted to an analog signal) and sent to RF TX 310 for transmission. The frequency domain preamble symbols provide a reference signal that may be used by the receiver for timing and frequency offset acquisition, receiver parameter calibration, and PHY payload decode. In at least one embodiment of transmitter 306, frequency domain preamble generator 414 provides a plurality of channel estimation frequency domain symbols (e.g., two channel estimation symbols) to other portions of transmitter 306 (e.g., subcarrier mapper 424, ACMT modulator 420, filter 418, and DAC 416). In at least one embodiment of transmitter 306, time domain preamble generator 412 inserts a plurality of time domain symbols directly to filter 418 for digital-to-analog conversion and then transmission over the link. The time domain preamble symbols provide a reference signal that may be used by the receiver to identify packet type and for symbol timing and frequency offset acquisition.

Figure 5:
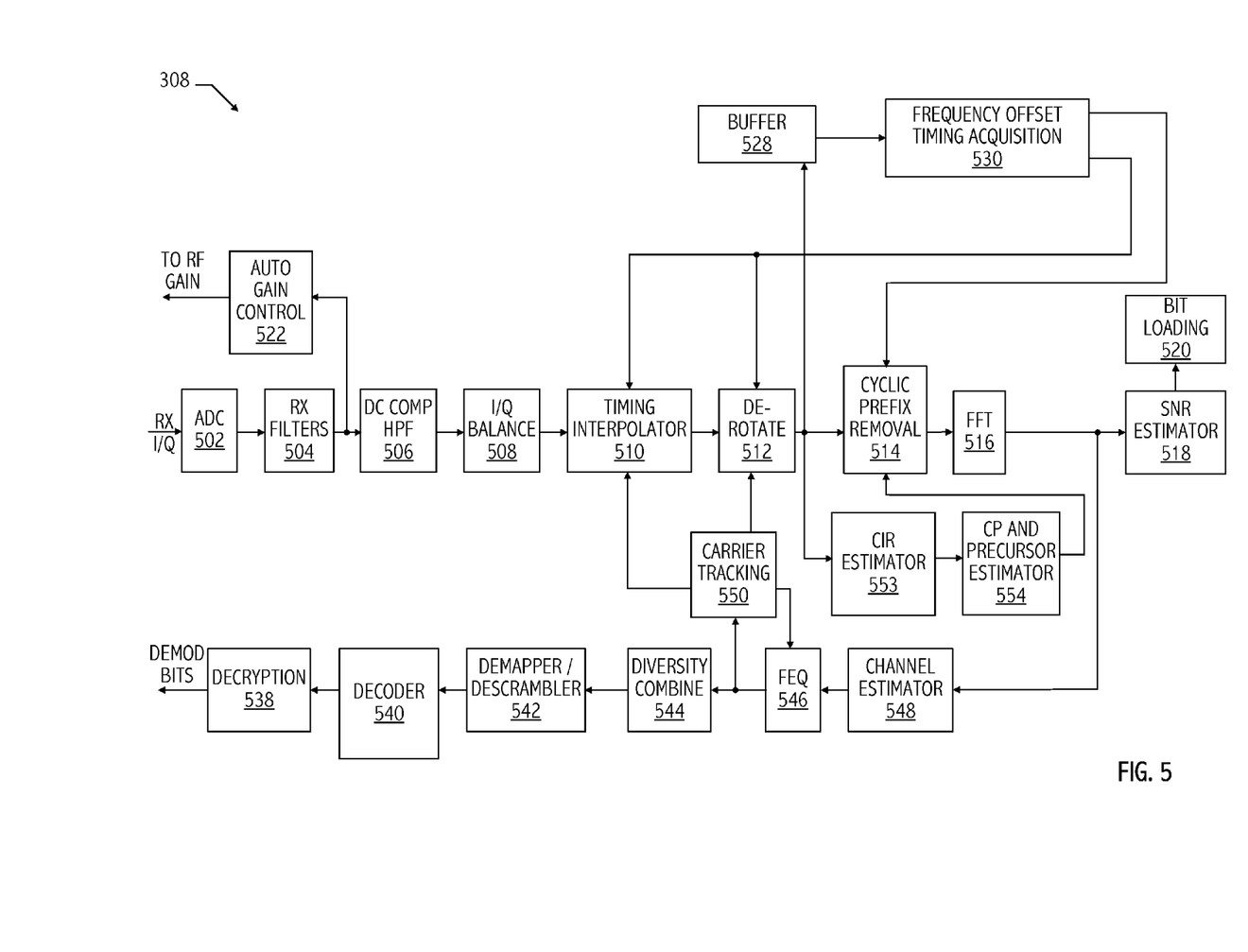
FIG. 5 illustrates a functional block diagram of an exemplary receiver path of the node device of FIG. 3 consistent with at least one embodiment of the invention.

Referring to FIG. 5 in at least one embodiment, receiver 308 receives an analog signal from the RF receiver interface (e.g., RF receiver 312 of FIG. 3) and analog-to-digital converter (e.g., ADC 502) converts in-phase and quadrature analog signal components of the received signal into a complex digital signal. Referring back to FIG. 5, in at least one embodiment of receiver 308, one or more filters (e.g., RX filters 504) limit the complex digital signal to a baseband signal having a particular bandwidth. In at least one embodiment of receiver 308, one or more other filters (e.g., high-pass filter 506) attenuates or removes a DC component of the complex digital signal. In at least one embodiment of receiver 308, I/Q balance module 508 adjusts the real and imaginary components of the complex baseband signal, which are balanced at the transmitting node, but become unbalanced after transmission over the channel by analog circuitry and due to any imbalance introduced by RF receiver 312. I/Q balance module 508 adjusts the in-phase and quadrature components of the complex baseband signal to have approximately the same gain and/or phase. In at least one embodiment of receiver 308, a timing module (e.g., timing interpolator module 510) adjusts the sample timing based on a timing offset, e.g., by using a delay filter to interpolate samples and generate an output sample having a particular timing based on the timing offset. In at least one embodiment of receiver 308, a frequency offset correction module (e.g., de-rotator module 512) compensates for any frequency offset e.g., by performing a complex multiply of the received data with a complex data value based on a previously determined target angle of rotation that compensates for the frequency offset. In at least one embodiment of receiver 308, a module (e.g., cyclic prefix removal module 514) strips a number of samples (e.g., $N_{CP}$ samples, where $N_{CP}$ is the number of samples inserted by the transmitter as the cyclic prefix) from the de-rotated data symbol and provides the resulting time domain symbol to a demodulator (e.g., fast Fourier transform (FFT) module 516), which generates frequency domain symbols.

In at least one embodiment of receiver 308, during data demodulation and decode sequences, a frequency domain equalizer (e.g., FEQ 546) reduces effects of a bandlimited channel using frequency domain equalizer taps generated by a channel estimation module (e.g., channel estimator 548), as described further below. In at least one embodiment of receiver 308, during data demodulation and decode sequences that communicate in a diversity mode (e.g., a mode in which the same signal is transmitted by multiple subcarriers) diversity combiner module 544 combines signals repeated on multiple subcarriers into a single improved signal (e.g., using a maximum ratio combining technique). In at least one embodiment of receiver 308, frequency domain symbols are demapped from the subcarriers and descrambled (e.g., using demapper/descrambler module 542) according to a technique consistent with the mapping and scrambling technique used on a transmitting node. The demapped and descrambled bits are decoded (e.g., using decoder 540) consistent with coding used by a transmitting node. A decryption module (decryptor 538) recovers demodulated bits and provides them to a processor for further processing.

In at least one embodiment of receiver 308, carrier tracking module 550 uses a pilot subcarrier ($n_P$) that carries known training data to synchronize the frequency and phase of the receiver clock with the transmitter clock. A typical pilot tone transmitted from the source node has only a real component (i.e., the imaginary component is zero), and the imaginary part of the complex output of subcarrier $n_P$ from the FFT is input to a feedback loop on the receiver. That feedback loop is configured to adjust the receive clock signal to drive to zero the recovered imaginary part of the pilot tone. The imaginary part of the complex output of subcarrier $n_P$ from the FFT is input to a loop filter, which via a digital-to-analog converter delivers a digital control signal to de-rotator 512 and timing interpolator 510. However, in other embodiments of receiver 308, the output of the loop filter is a control voltage that is provided to a VCXO that adjusts the frequency of the receive clock. In at least one embodiment of receiver 308, rather than dedicating one or more subcarriers to being pilot tones that carry known data, a carrierless tracking technique is used to generate an indicator of frequency offset that is used to adjust the frequency of the receive clock.

In general, FEQ 546 reduces effects of the bandlimited channel by equalizing the channel response. In at least one embodiment of receiver 308, a payload packet received over a particular link includes a preamble portion that includes one or more symbols for channel estimation. A typical channel estimation symbol is generated at a transmitting node associated with the particular link using a pseudorandom number generator, obtained from a storage device, or generated using another suitable technique. In at least one embodiment of receiver 308, channel estimator 548 estimates the channel response based on received channel estimation symbols. Channel estimator 548 determines frequency domain equalizer coefficients for the link based on that estimated channel response (i.e., channel response estimate) and provides the frequency domain equalizer coefficients to FEQ 546 for use during data demodulation and decode sequences.

In a typical OFDM system, a transmitter oscillator frequency and subcarrier frequencies are related by integers. A technique for synchronizing subcarriers at the receiver to subcarriers generated at a transmitting node uses at least one frequency offset determination during an acquisition interval (e.g., coarse and fine frequency offset determinations). For example, a coarse frequency offset determination technique may resolve offsets greater than ½ of the subcarrier spacing, and fine frequency offset determinations may resolve offsets up to ½ of the subcarrier spacing. In at least one embodiment of receiver 308, frequency offset and timing acquisition module 530 performs both coarse frequency acquisition and fine frequency acquisition to determine timing offsets and frequency offsets using known sequences received as part of a packet preamble. The coarse and fine frequency acquisition techniques use known symbols and require channel stationarity for the corresponding time interval. However, once the preamble of a packet is over, slight changes in the overall system may result in additional frequency offset. Accordingly, a carrier tracking module (e.g., carrier tracking module 550) implements a decision-directed, frequency tracking technique to determine frequency offsets for reliable data demodulation that compensates for the time-varying nature of carriers to achieve and maintain a target system performance level (e.g., target bit-error rate).

In at least one embodiment of receiver 308, during timing and frequency acquisition sequences, a gain control module (e.g., automatic gain control module 522) provides power adjustment signals to monotonically adjust analog gain of the RF receiver interface (e.g., RF receiver 312 of FIG. 3) using adjustments in a particular range and step size. Referring back to FIG. 5, in at least one embodiment of receiver 308, during timing and frequency acquisition sequences, the output of de-rotator 512 is stored in a storage device (e.g., buffer 528). The stored data is used to detect a preamble of a packet (e.g., using preamble detection module 526). In at least one embodiment, a frequency offset and timing acquisition module (e.g., frequency offset and timing acquisition module 530) generates an indication of a start of a symbol and an indication of a frequency offset for use by the receiver for recovery of subsequent received symbols (e.g., timing interpolator 510, de-rotator 512, and cyclic prefix removal module 514).

Referring back to FIG. 3, in at least some embodiments, transmitter 306 and receiver 308 have a variable cyclic prefix length. Receiver 308 determines a cyclic prefix length and determines an associated precursor based on a signal received over the channel between a transmitting node and a receiving node. A technique for selecting a cyclic prefix length chooses the shortest allowable cyclic prefix length based on a window length of a window of a magnitude squared channel impulse response estimate that contains at least a predetermined amount of channel impulse response energy.

In general, a practical channel delays and spreads a transmitted impulse. The channel impulse response (e.g., h[n]) accounts for the effects of transmit and receive filters, the channel itself, and other datapath elements between the modulator and the demodulator. Typically, designers choose a cyclic prefix length based on the expected duration of the multipath channel in the operating environment. Although a practical channel has an impulse response of a substantially long (e.g., greater than the length of a symbol) or infinite length, the length of a theoretically infinite impulse response is typically approximated to be a symbol length. The impulse response of the channel is defined by a first window limited to the symbol length, i.e., $$h[i] \text{ for } 0 \leq i \leq N-1,$$

and a cyclic prefix of $N_c p$ terms is used. The cyclic prefix length and precursor joint estimation technique identifies a shortest cyclic prefix length ($N_{CP}$) for demodulation of a symbol of samples from the received symbols that includes at least a predetermined amount of energy in the block of $N_{CP}$ contiguous h terms.

$$(h^2[k]+h^2[k+1]+h^2[k+2]+\ldots+h^2[k+N_{CP}]).$$

The technique jointly determines a value of $N_{CP}$ and a value for the precursor that maximizes the energy in a windowed magnitude squared channel impulse response estimate. During subsequent data recovery, using the selected cyclic prefix length and precursor, the receiver provides a set of N received samples to the demodulator that will result in an SNR greater than or equal to the SNR of other sets of N samples from the received symbol of $N+N_{CP}$ samples.

In at least one embodiment, the technique for selecting a cyclic prefix length, $N_{CP}$, estimates the cyclic prefix length by identifying as k an index (i.e., $n_{PEAK}$) to the channel impulse response associated with a tap having a peak magnitude squared channel impulse response estimate value (i.e., the "main tap" of the channel impulse response). The channel impulse response may include nontrivial portions before and after the main tap referred to as precursors and postcursors, respectively. If k is equal to zero, the precursor is equal to zero, and the impulse response only has postcursors (i.e., all of the energy is in the postcursor). Accordingly, the receiver delays collecting the N samples for providing to a demodulator until the transient response has finished.

Figure 7:
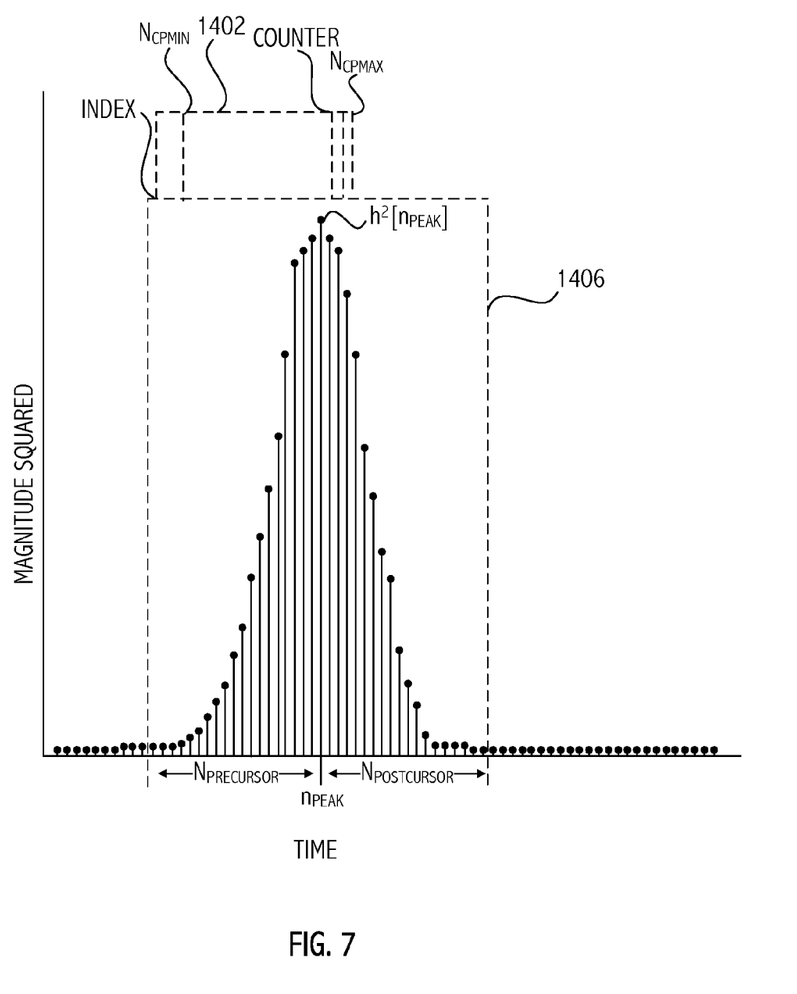
FIG. 7 illustrates exemplary symbol timing sequences for symbols based on the cyclic prefix length and precursor selected by a cyclic prefix and precursor joint estimation technique consistent with at least one embodiment of the invention.

Referring to FIG. 7, in practical systems, the channel impulse response may include precursor and postcursor portions and thus, k is not equal to zero. Rather, the channel impulse response includes significant energy terms before and after $h^2[k]$ (i.e., there are $N_{PRECURSOR}$ precursor terms and $N_{POSTCURSOR}$ postcursor terms, respectively) although generally, more energy is present in the postcursor (i.e., the channel impulse response estimate samples after the sample associated with a peak magnitude squared channel impulse response estimate value) and the precursor is typically less than the postcursor. The precursor of the channel impulse response is the number of channel impulse response samples prior to sample k of the channel impulse response estimate, and the postcursor is the number of channel impulse response estimate samples after sample k. An indication of the precursor value is used by the receiver to adjust the set of samples included in a symbol provided to a demodulator.

For a particular cyclic prefix length, in order to demodulate a set of symbols that has the greatest signal-to-noise ratio, a set of samples provided to the demodulator is selected based on a precursor estimate that indicates precursor and postcursor portions of the channel impulse response estimate. The receiver discards a number of cyclic prefix samples from the beginning of the received symbol. Those discarded samples correspond to the postcursor portion of the channel impulse response. The receiver also discards a number of samples from the end of the received symbol corresponding to the precursor portion of the channel impulse response. The number of samples to discard from each portion of the received symbol is based on a value of a precursor corresponding to the cyclic prefix length. A cyclic prefix and precursor joint estimation technique determines a precursor value ($N_P$) during the selection of a cyclic prefix length ($N_{CP}$) for a particular channel. The receiver uses the precursor value and the cyclic prefix length to provide to a demodulator a set of samples (having a symbol length of N samples) that will result in the greatest SNR for the received symbol length ($N+N_{CP}$ samples).

Figure 6:
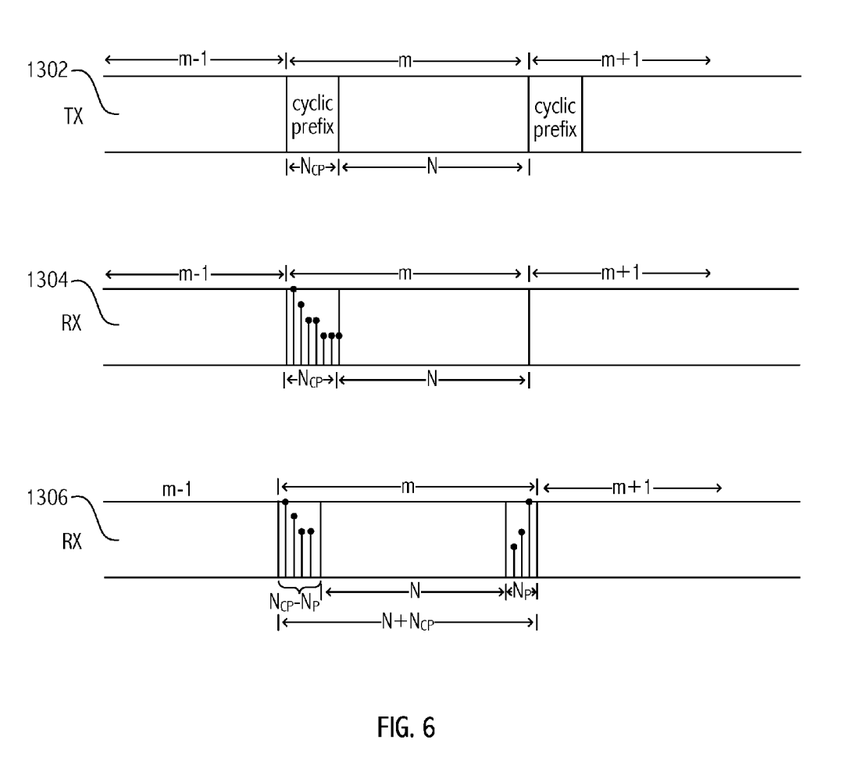
FIG. 6 illustrates a relationship of cyclic prefix samples, transmit symbol samples, precursor, and received symbol samples consistent with at least one embodiment of the invention.

Referring to FIG. 6, for example, a transmitter transmits symbols of length $N+N_{CP}$ (1302). When the precursor is zero (i.e., $N_P=0$), the receiver strips the first $N_{CP}$ samples of a received symbol and provides the next N samples of the received symbol to the demodulator (1304). However, when the precursor is greater than zero (i.e., $N_P>0$) (1306), the receiver strips from the beginning of the received symbol a number of samples (e.g., $N_{CP}-N_P$ samples) that is less than the cyclic prefix length. The receiver provides the next N samples of the received symbol to the demodulator. The receiver discards the remaining number of samples (e.g., $N_P$ bits) of the received symbol.

Figure 8:
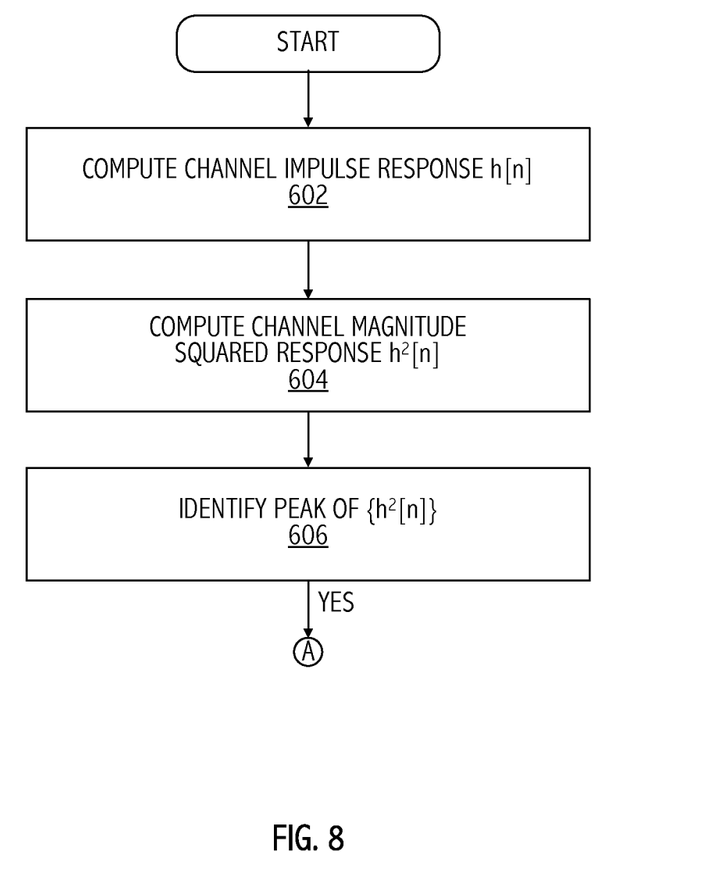
FIGS. 8 and 9 illustrate information and control flows for an exemplary cyclic prefix and precursor joint estimation technique consistent with at least one embodiment of the invention.
Figure 10:
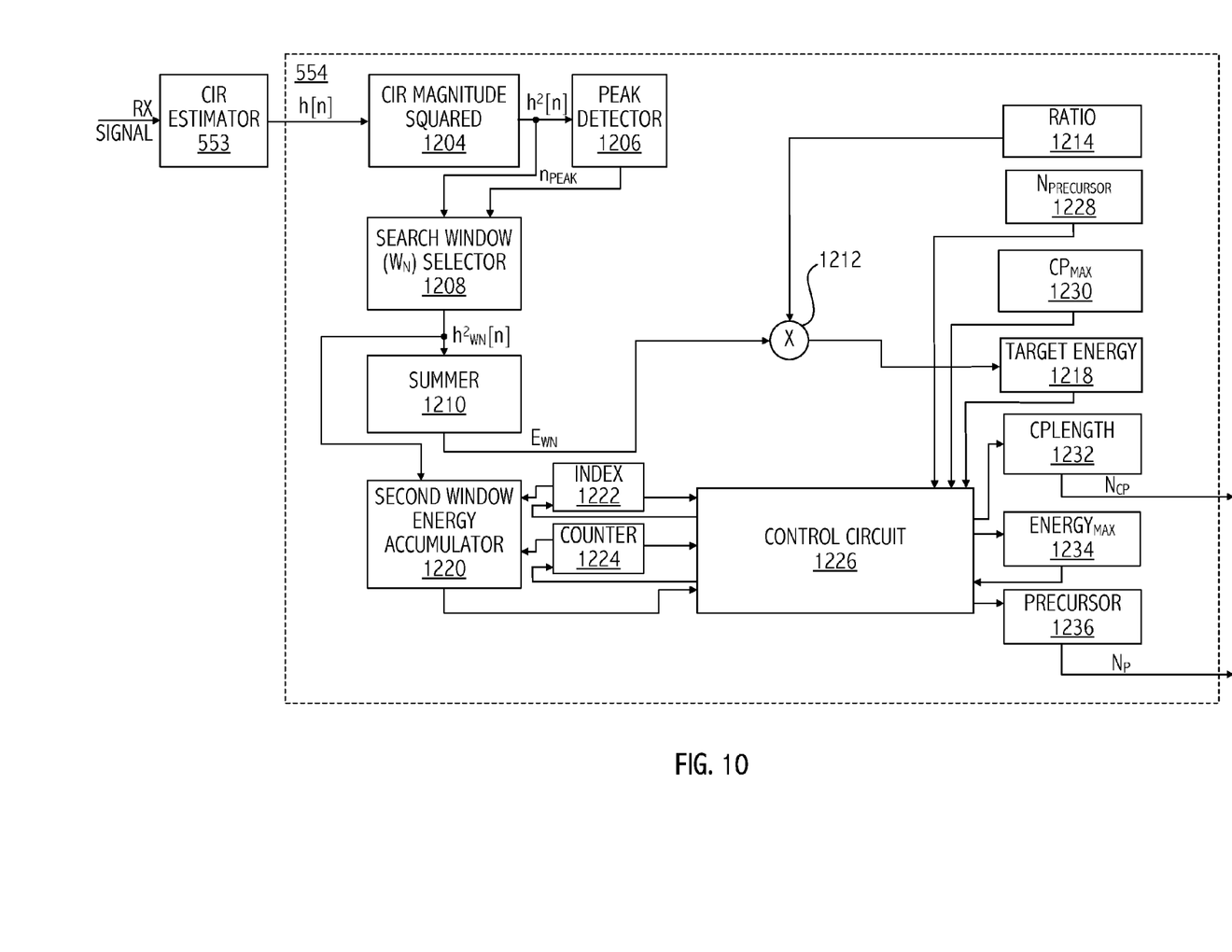
FIG. 10 illustrates a functional block diagram of an exemplary cyclic prefix and precursor joint estimation module consistent with at least one embodiment of the invention.

Referring to FIGS. 5, 8, and 10, in at least one embodiment, a cyclic prefix length and precursor joint estimation technique determines a cyclic prefix length and precursor based on a channel impulse response estimate, a target cyclic prefix energy level, and a predetermined range of cyclic prefix lengths. The joint estimation technique includes generating a channel impulse response estimate, h[n], based on a known, received calibration signal (e.g., a signal including a known, pseudorandom sequence having a flat frequency spectrum). A channel impulse response generator (e.g., channel impulse response estimator 553) creates a matched filter for the known calibration signal and processes the received calibration signal using the matched filter to generate the channel impulse response estimate (602). Channel impulse response generator 553 provides the channel impulse response to a cyclic prefix estimation module (e.g., cyclic prefix and precursor joint estimator 554). In at least one embodiment, cyclic prefix and precursor joint estimator 554 includes magnitude squared channel impulse response estimator 1204, which squares the magnitudes of the taps of the channel impulse response estimate (604). A peak detection module (e.g., peak detector 1206) identifies an index ($n_{PEAK}$) of the magnitude squared channel impulse response estimate that corresponds to a peak value of the magnitude squared channel impulse response estimate (606).

Figure 9:
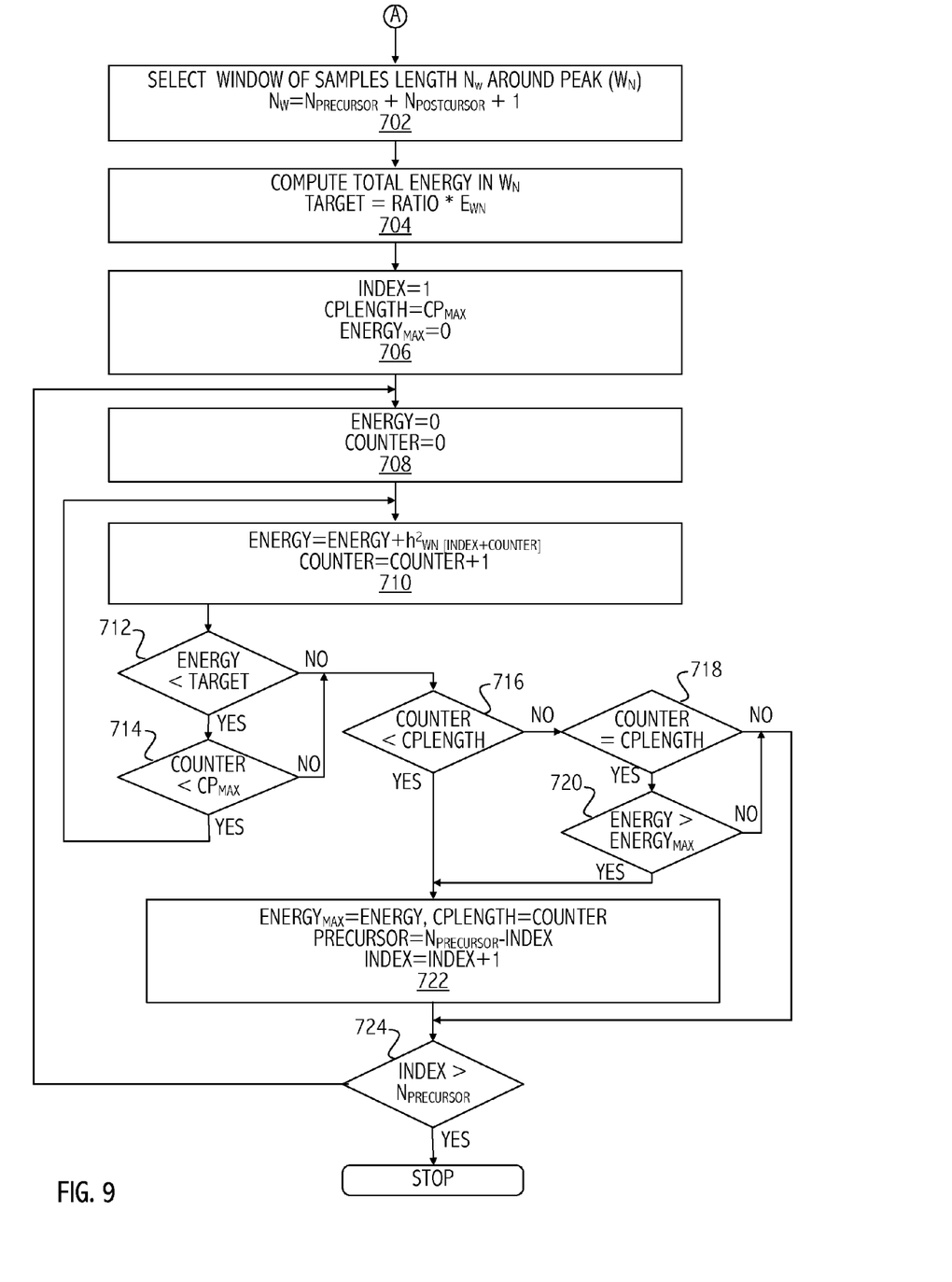

Referring to FIGS. 7, 9, and 10, search window selector 1208 determines a window of $N_W$ samples including the sample corresponding to $n_{PEAK}$, to be applied to the magnitude squared channel impulse response estimate (702). In general, the search window includes precursor samples, the peak magnitude squared channel impulse response estimate sample, and postcursor samples (i.e., $N_W=N_{PRECURSOR}+N_{POSTCURSOR}+1$). For example, search window selector 1208 generates a window having a same number of samples equal to twice a maximum cyclic prefix length (i.e., $N_W=2\times CP_{MAX}$, e.g., window 1406). Note that although a search window having a length of twice the maximum allowable cyclic prefix length is large enough to identify a cyclic prefix length for a channel impulse response that includes precursor, postcursor, or a combination of precursor and postcursor components, other suitable search window lengths may be used. In at least one embodiment, search window selector 1208 centers the window around the sample corresponding to $n_{PEAK}$. That is, the number of samples in search window 1406 before the peak magnitude squared channel impulse response estimate value (i.e., precursor samples) and the number of samples in search window 1406 after the peak magnitude squared channel impulse response estimate value (i.e., postcursor samples) are approximately equal (i.e., $0 \leq N_{POSTCURSOR}-N_{PRECURSOR} \leq 1$). In other embodiments, since the channel impulse response is not typically symmetrical, the search window selector generates a search window having a different number of precursor samples and postcursor samples (i.e., $N_{POSTCURSOR}-N_{PRECURSOR}>1$). Although the values of $N_{PRECURSOR}$ and $N_{POSTCURSOR}$ of the search window are predetermined, in at least one embodiment of the cyclic prefix and precursor joint estimation technique, those values are programmable and are provided by a user (e.g., using pins, fuses, values stored in a storage device, or other suitable technique) based on theoretical or experimental results.

Referring to FIGS. 7, 9, and 10, in at least one embodiment of cyclic prefix and precursor joint estimator 554, search window selector 1208 provides an indicator of the search window to subsequent modules (e.g., summer 1210 and second window energy accumulator 1220) which use the indicator to access appropriate samples of the magnitude squared channel impulse response estimate. In at least one embodiment, search window selector 1208 defines the search window using an index to a first sample of the magnitude squared channel impulse response estimate, a search window length, an index of $n_{PEAK}$ in the magnitude squared channel impulse response estimate, a search window precursor length ($N_{PRECURSOR}$), and/or other suitable indices to the magnitude squared channel impulse response estimate. Cyclic prefix and precursor joint estimator 554 uses those indices and/or lengths to access magnitude squared channel impulse response estimates stored in a storage device corresponding to indices of the window. In at least one embodiment, rather than use indices to the magnitude squared channel impulse response estimate, search window selector 1208 provides the actual samples of the window of the magnitude squared channel impulse response estimate to subsequent modules (e.g., summer 1210). A summing module (e.g., summer 1210) generates an estimate of the total energy in the search window (i.e., $\Sigma h^2{}_{WN}[n]=E_{WN}$) (704). Summer 1210 provides the total energy estimate ($E_{WN}$) to a target energy computation module (e.g., multiplier 1212), which generates a target energy estimate based on the total energy in the window and a predetermined energy ratio (e.g., a ratio stored in ratio storage element 1214) (704) and stores it in a storage element (e.g., target energy 1218) for use by control logic (e.g., control circuit 1226).

Control circuit 1226 uses the target energy and the search window of the magnitude squared channel impulse response estimates to determine a cyclic prefix length within a predetermined range of cyclic prefix lengths. In at least one embodiment, control circuit 1226 receives both a minimum cyclic prefix length and a maximum cyclic prefix length to determine the range of cyclic prefix lengths. In other embodiments, control circuit 1226 receives only a maximum cyclic prefix length and assumes a minimum cyclic prefix length of '0.'

In at least one embodiment, control circuit 1226 defines a second window (1402) within the search window (1406), and initializes search variables. For example, control circuit 1226 sets a second window index (e.g., index 1222) to a first sample of the search window (e.g., '1'), a second window length variable (e.g., $CP_{LENGTH}$ 1232) to a predetermined maximum cyclic prefix length (e.g., $CP_{MAX}$), and clears a maximum energy value (e.g., $ENERGY_{MAX}$) associated with all of the second windows evaluated (706). Control circuit 1226 initializes an energy value (e.g., second window energy accumulator 1220) for a second window and a second window length counter (e.g., counter 1224) to '0' (708). Control circuit 1226 signals second window energy accumulator 1220 to generate an energy estimate by accumulating the magnitude squared channel impulse response estimates in a second window defined to have the length indicated by counter 1224 by incrementing counter 1224 and accumulating magnitude squared channel impulse response estimates corresponding to the state of counter 1224 (710). If the energy estimate of second window energy accumulator 1220 is less than the target energy (i.e., the second window, having a length corresponding to contents of counter 1224, does not include at least the target energy level) (712) and the counter 1224 has not reached the maximum cyclic prefix length (714), then control circuit 1226 signals an increase of the second window length by incrementing counter 1224 and signals second window energy accumulator 1220 to accumulate a magnitude squared channel impulse response estimate corresponding to a next sample in the second window defined by counter 1224 and index 1222 (710).

If the energy estimate of second window energy accumulator 1220 is greater than or equal to the target energy (712) or if the energy estimate of second window energy accumulator 1220 is less than the target energy (712) and counter 1224 has reached the maximum cyclic prefix length (714), then if counter 1224 is less than the retained cyclic prefix length (e.g., CPLENGTH) (716), control circuit 1226 retains the state associated with counter 1224 and corresponding precursor value (722). For example, control circuit 1226 stores the contents of counter 1224 as the current cyclic prefix length (e.g., in CPLENGTH 1232) and stores the maximum energy corresponding to that current second window length in a maximum energy storage element (e.g., $ENERGY_{MAX}$ 1234). Control circuit 1226 determines a precursor value corresponding to that particular cyclic prefix length by subtracting the value of index 1222 from the length of the search window precursor (e.g., $N_{PRECURSOR}$), and stores the difference in a precursor storage element (e.g., PRECURSOR 1236). Control circuit 1226 increments index 1222, and then determines whether or not to continue the search for a cyclic prefix length and corresponding precursor (724).

If the energy estimate of second window energy accumulator 1220 is greater than or equal to the target energy (712) or if the energy estimate of second window energy accumulator 1220 is less than the target energy (712) and the current second window length counter has reached the maximum cyclic prefix length (714), then if the cyclic prefix length is greater than or equal to the retained cyclic prefix length (716), control circuit 1226 determines whether the current second window length equals the retained cyclic prefix length (718). If the current second window length equals the retained cyclic prefix length (718) and the current accumulated energy is less than a retained accumulated energy corresponding to the retained cyclic prefix length and precursor (720), control circuit 1226 does not update the retained cyclic prefix length, precursor, and corresponding accumulated energy values, and determines whether to continue the search (724). If the current second window length does not equal the retained cyclic prefix length (718), control circuit 1226 does not update the retained cyclic prefix length, precursor, and corresponding accumulated energy values, and determines whether to continue the search (724). If the current second window length equals the retained cyclic prefix length (718) and the current accumulated energy is greater than a retained accumulated energy corresponding to the retained cyclic prefix length and precursor (720), control circuit 1226 updates the retained cyclic prefix length, precursor, and corresponding maximum accumulated energy value (722), and then determines whether to continue the search (724).

If index 1222 is greater than the number of samples in the search window precursor (724), then control circuit 1226 ends the search and cyclic prefix and precursor joint estimator 554 provides the contents of CPLENGTH 1232 and PRECURSOR 1236 as the selected cyclic prefix length ($N_{CP}$) and precursor ($N_P$), respectively, to cyclic prefix removal module 514 for use in data recovery from payload packets subsequently received by receiver 308. In addition, the selected cyclic prefix length ($N_{CP}$) is communicated to a transmitting node for use in generating those subsequently received payload packets.

Referring to FIGS. 5 and 6, cyclic prefix removal module 514 uses the cyclic prefix length to select N samples, starting at an index of $N_{CP}$–$N_P$ of a symbol with N+$N_{CP}$ samples to FFT 516 for demodulation. For example, if the selected precursor has a value of 5 for a cyclic prefix length of 32, then cyclic prefix removal module 514 starts at an index of $N_{CP}$–$N_P$=32–5=27 and provides the next N samples to FFT 516 and discards the last five samples. Although the total number of cyclic prefix samples were discarded, a portion of the discarded samples are selected from the beginning of the received symbol and a portion are selected from the end of the received symbol. Thus, the greatest amount of energy of the channel impulse response (i.e., the greatest amount of intersymbol interference) is captured by the cyclic prefix, thereby reducing intersymbol interference and increasing the SNR of the symbol provided to FFT 516, as compared to a symbol generated based on stripping all cyclic prefix samples from the beginning of the symbol. In at least one embodiment, cyclic prefix removal module 514 selects the N samples and stores them in a storage device for later processing. In at least one embodiment of receiver 308, cyclic prefix removal module 514 is excluded and FFT 516 directly selects N samples from the received symbol based on N, $N_{CP}$, and $N_P$. In at least one embodiment, cyclic prefix removal module 514 removes the cyclic prefix by manipulating the update of an address pointer, e.g., the cyclic prefix may be removed by skipping $N_{CP}$–$N_P$ of samples for every N+$N_{CP}$ of received samples.

In an exemplary system, N is 256 and the $N_{CP}$ ranges from ten to 64 samples, i.e., $CP_{MAX}$=64 and $CP_{MIN\ b=10}$. Accordingly, in some embodiments of cyclic prefix and precursor joint estimator 554, if the selected $CP_{LENGTH}$ is less than the $CP_{MIN}$, then the selected $CP_{LENGTH}$ is set to $CP_{MIN}$. In other embodiments of cyclic prefix and precursor joint estimator 554, rather than initializing counter 1224 to 0, counter 1224 is initialized to $CP_{MIN}$ and the energy is initialized to the energy of samples 1 to $CP_{MIN}$–1. However, such value of N and range of $N_{CP}$ are exemplary only and techniques described herein may be used with other suitable values and ranges.

While circuits and physical structures have been generally presumed in describing embodiments of the invention, it is well recognized that in modern semiconductor design and fabrication, physical structures and circuits may be embodied in computer-readable descriptive form suitable for use in subsequent design, simulation, test or fabrication stages. Structures and functionality presented as discrete components in the exemplary configurations may be implemented as a combined structure or component. Various embodiments of the invention are contemplated to include circuits, systems of circuits, related methods, and tangible computer-readable medium having encodings thereon (e.g., VHSIC Hardware Description Language (VHDL), Verilog, GDSII data, Electronic Design Interchange Format (EDIF), and/or Gerber file) of such circuits, systems, and methods, all as described herein, and as defined in the appended claims. In addition, the computer-readable media may store instructions as well as data that can be used to implement the invention. The instructions/data may be related to hardware, software, firmware or combinations thereof.

The description of the invention set forth herein is illustrative, and is not intended to limit the scope of the invention as set forth in the following claims. For example, while the invention has been described in an embodiment in which a receiver receives communications over a channel including coaxial cable, one of skill in the art will appreciate that the teachings herein can be utilized with devices consistent with other OFDM communications protocols and/or other wireline or wireless channels. Variations and modifications of the embodiments disclosed herein, may be made based on the description set forth herein, without departing from the scope and spirit of the invention as set forth in the following claims.

What is claimed is:

1. A method of operating a communications system comprising:
   generating a channel impulse response estimate based on a first received signal;
   selecting a precursor and a cyclic prefix length for a second received signal based on the channel impulse response estimate, a target cyclic prefix energy level, and a predetermined range of cyclic prefix lengths; and
   demodulating a symbol of the second received signal according to the cyclic prefix length and the precursor, wherein demodulating the symbol comprises:
   demodulating a first number of data samples of the symbol; and
   discarding a second number of cyclic prefix samples of the symbol, the second number being the length of the cyclic prefix.

2. The method, as recited in claim 1, wherein the first received signal includes a calibration signal and the second received signal includes symbols generated based on the cyclic prefix length.

3. The method, as recited in claim 1, further comprising:
   estimating a total energy of the channel impulse response included in a first window of the channel impulse response; and
   generating the target cyclic prefix energy level based on a predetermined ratio and the total energy of the channel impulse response included in the first window.

4. The method, as recited in claim 1, further comprising:
   transmitting the cyclic prefix length to a transmitting node configured to generate a signal corresponding to the second received signal by prepending a number of samples from the end of the symbol to the beginning of the symbol, the number of samples being the cyclic prefix length.

5. The method, as recited in claim 1, wherein the precursor is a number of channel impulse response samples prior to a main tap of the channel impulse response estimate and a postcursor is a number of channel impulse response estimate samples after the main tap of the channel impulse response estimate.

6. A method of operating a communications system comprising:
   generating a channel impulse response estimate based on a first received signal;
   selecting a cyclic prefix length and precursor for a second received signal based on the channel impulse response estimate, a target cyclic prefix energy level, and a predetermined range of cyclic prefix lengths, wherein selecting the cyclic prefix length and precursor comprises:
   generating a magnitude squared channel impulse response estimate based on the channel impulse response estimate; and
   selecting a first window of values of the magnitude squared channel impulse response estimate, the first window including a peak value of the magnitude squared channel impulse response estimate.

7. The method, as recited in claim 6, further comprising:
   demodulating a symbol of the second received signal according to the cyclic prefix length and the precursor.

8. The method, as recited in claim 7, wherein demodulating the symbol comprises:
   demodulating a first number of data samples of the symbol; and
   discarding a second number of cyclic prefix samples of the symbol, the second number being the length of the cyclic prefix.

9. The method, as recited in claim 8, wherein samples of the symbol are selected as the data samples based on the precursor and the cyclic prefix length.

10. The method, as recited in claim 8, further comprising:
    receiving the second received signal; and
    generating the symbol based on the second received signal, a total number of complex samples of the symbol being a total number of OFDM carriers used by the communications system plus the length of the cyclic prefix.

11. The method, as recited in claim 6, wherein selecting the cyclic prefix length and precursor further comprises:
    determining a first length of a second window of values of the magnitude squared channel impulse response estimate, the second window being within the first window and including the peak value of the magnitude squared channel impulse response estimate, the second window having a first precursor with respect to the peak value of the magnitude squared channel impulse response estimate, the first length of the second window being a smallest length of the second window that includes a total energy of the channel impulse response that is at least a target cyclic prefix energy level.

12. The method, as recited in claim 11, wherein selecting the cyclic prefix length and precursor further comprises:
    determining a second length of a third window of values of the magnitude squared channel impulse response estimate, the third window being within the first window and including the peak value of the magnitude squared channel impulse response estimate, the third window having a second precursor with respect to the peak value of the magnitude squared channel impulse response estimate, the second length of the third window being a smallest length of the third window that includes a total energy of the channel impulse response that is at least the target cyclic prefix energy level; and
    selecting as the cyclic prefix length a smallest length of the first and second lengths.

13. The method, as recited in claim 12, wherein the first and second lengths are the same and the selecting the cyclic prefix length and precursor further comprises:
    selecting one of the first precursor and the second precursor as the precursor based on a first total energy of the channel impulse response included in the second window and a second total energy of the channel impulse response included in the third window.

14. The method, as recited in claim 6, wherein the precursor is a number of channel impulse response samples prior to a main tap of the channel impulse response estimate and a postcursor is a number of channel impulse response estimate samples after the main tap of the channel impulse response estimate.

15. An apparatus comprising:
    a channel estimator configured to generate a channel impulse response estimate in response to a first received signal; and
    a cyclic prefix and precursor joint selection module configured to determine a cyclic prefix length and a precursor based on the channel impulse response estimate, a target cyclic prefix energy level, and a predetermined range of cyclic prefix lengths, wherein the cyclic prefix and precursor joint selection module comprises:
       a magnitude squared estimator configured to generate a magnitude squared channel impulse response estimate based on the channel impulse response estimate; and
       a peak detector configured to identify a peak value of the magnitude squared channel impulse response estimate.

16. The apparatus, as recited in claim 15, wherein the cyclic prefix and precursor joint selection module further comprises:
    a control circuit configured to adjust an index and a counter based on a sum of energy in a first window of the magnitude squared channel impulse response estimate, the first window being within a second window of the magnitude squared channel impulse response estimate, both the first and second windows including the peak value, the control circuit being configured to adjust the index and counter based on the target cyclic prefix energy level and the predetermined range of cyclic prefix lengths.

17. The apparatus, as recited in claim 16, wherein the cyclic prefix and precursor joint selection module further comprises:
    a summer configured to compute a total energy in the second window of the magnitude squared channel impulse response estimate; and
    a multiplier configured to generate the target cyclic prefix energy level based on the total energy in the second window and a predetermined ratio.

18. The apparatus, as recited in claim 17, wherein the cyclic prefix and precursor joint selection module further comprises:
    an accumulator configured to generate a sum of energy in the first window based on the index and the counter, the index indicating a first sample of the first window with respect to the peak value and the counter indicating a total width of the first window.

19. The apparatus, as recited in claim 16, wherein the cyclic prefix and precursor joint selection module further comprises:
    a window selection module configured to determine the first window based on an index to the peak value.

20. The apparatus, as recited in claim 15, further comprising:
    a cyclic prefix removal module configured to provide a set of samples of a second received signal to a demodulator, the set of samples being selected based on the cyclic prefix length and the precursor; and
    a demodulator configured to process the set of samples in parallel to generate individual symbols corresponding to individual subcarriers.

21. The apparatus, as recited in claim 15, wherein the precursor is a number of channel impulse response samples prior to a main tap of the channel impulse response estimate and a postcursor is a number of channel impulse response estimate samples after the main tap of the channel impulse response estimate.

* * * * *